United States Patent [19]

Mahaffey, Jr.

[11] Patent Number: 5,998,621

[45] Date of Patent: Dec. 7, 1999

[54] ARYLOXY-POLY(OXYALKYLENE) NAPHTHALIMIDE DERIVATIVE COLORANTS

[75] Inventor: Robert L. Mahaffey, Jr., Spartanburg, S.C.

[73] Assignee: Milliken & Company, Spartanburg, S.C.

[21] Appl. No.: 09/241,580

[22] Filed: Feb. 2, 1999

[51] Int. Cl.[6] ................................................. C07D 221/04
[52] U.S. Cl. ............................................................ 546/100
[58] Field of Search .............................................. 546/100

[56] References Cited

U.S. PATENT DOCUMENTS

| | | | |
|---|---|---|---|
| Re. 35,370 | 11/1996 | Henry | 73/40.7 |
| Re. 35,395 | 12/1996 | Henry | 73/40.7 |
| 2,385,106 | 9/1945 | Scalera et al. | 260/281 |
| 3,147,264 | 9/1964 | Klein | 260/281 |
| 4,992,204 | 2/1991 | Kluger et al. | 252/301.16 |
| 5,235,045 | 8/1993 | Lewis et al. | 534/560 |
| 5,308,773 | 5/1994 | Lewis et al. | 436/73 |
| 5,357,782 | 10/1994 | Henry | 73/40.7 |
| 5,420,136 | 5/1995 | Lewis et al. | 514/296 |
| 5,421,192 | 6/1995 | Henry | 73/40.7 |
| 5,472,878 | 12/1995 | Lewis et al. | 436/61 |
| 5,565,551 | 10/1996 | Lewis et al. | |
| 5,681,984 | 10/1997 | Cavestri | 73/40.7 |
| 5,766,600 | 6/1998 | Lewis et al. | 424/204.1 |

FOREIGN PATENT DOCUMENTS 193650   1/1979   Czechoslovakia .

*Primary Examiner*—Zinna Northington Davis
*Assistant Examiner*—Binto Robinson
*Attorney, Agent, or Firm*—Terry T. Moyer; William S. Parks

[57] ABSTRACT

This invention relates to colorants comprising naphthalimide base groups with specific water-solubilizing pendant moieties attached. These pendant moieties are based upon aryloxypolyoxyalkylene groups which provide the desired solubility to the naphthalimide colorant compound. Furthermore, the aryloxypolyoxyalkylene groups facilitate the further addition of other pendant groups to the base compound which increase or decrease the solubility of the resultant naphthalimide derivative colorant as well. Such modified naphthalimides are useful as fluorescent colorants, particularly within other liquid media (both aqueous and non-aqueous) without the necessary inclusion of surfactants, solvents, diluents, and the like. Methods of making such colorants, as well as the aryloxypolyoxyallylene intermediates, are also contemplated within this invention.

3 Claims, No Drawings

ARYLOXY-POLY(OXYALKYLENE) NAPHTHALIMIDE DERIVATIVE COLORANTS

FIELD OF THE INVENTION

This invention relates to colorants comprising naphthalimide base groups with specific water-solubilizing pendant moieties attached. These pendant moieties are based upon aryloxy-poly(alkyleneoxy) groups which provide the desired solubility to the naphthalimide colorant compound, wherein the term aryloxy-poly(alkyleneoxy) is intended to denote the direct bonding of the aryl group to the naphthalimide nitrogen. Furthermore, the aryloxy-poly(alkyleneoxy) groups facilitate the further addition of other pendant groups to the base compound which increase or decrease the solubility of the resultant naphthalimide derivative colorant as well. Such modified naphthalimides are useful as fluorescent colorants, particularly within other liquid media (both aqueous and non-aqueous) without the necessary inclusion of surfactants, solvents, diluents, and the like. Methods of making such colorants, as well as the aryloxy-poly(alkyleneoxy) intermediates, are also contemplated within this invention.

DISCUSSION OF THE PRIOR ART

All U.S. and foreign patents cited within this specification are hereby incorporated by reference.

Naphthalimide colorants generally provide effective and desirable fluorescent colorations within different media, particularly in color detection applications. However, such colorants generally require dissolution within specific solvents in order to provide color to and/or within media in which they are not soluble. For example, standard naphthalimide colorants exist as waxes or oily solids, which are difficult to introduce within aqueous media (such as liquid detergents, and the like). Thus, some type of modification of such naphthalimide colorants is needed initially to provide such required solubility and ultimately to permit desirable colorations within aqueous compositions.

There are no prior teachings which disclose specific liquid naphthalimide derivative colorants comprising aryloxypolyoxyalkylenependant groups. There are previous disclosures regarding the production and utilization of other aryloxy-poly(alkyleneoxy) pendant groups, such as U.S. Pat. No. 4,992,204, to Kluger et al., and solid naphthalimide-based colorants, including U.S. Pat. No. Re. 35,370, to Henry, U.S. Pat. No. Re. 35,395, to Henry, U.S. Pat. No. 2,385,106, to Scalera et al., U.S. Pat. No. 3,147,264, to Klein, U.S. Pat. No. 5,235,045, to Lewis et al., U.S. Pat. No. 5,308,773, to Lewis et al., U.S. Pat. No. 5,357,782, to Henry, U.S. Pat. No. 5,420,136, to Lewis et al., U.S. Pat. No. 5,421,192, to Henry, U.S. Pat. No. 5,472,878, to Lewis et al., U.S. Pat. No. 5,565,551, to Lewis et al., U.S. Pat. No. 5,681,984, to Cavestri, and U.S. Pat. No. 5,766,600, to Lewis et al. The Scalera et al. reference appears to disclose the production of a highly viscous naphthalimide derivative; however, it has been determined that patentee's product is highly viscous only at the elevated temperatures at which the reactants are subjected during production of such a colorant. In fact, patentee's colorants all exist as solids at room temperature and thus all have measurable melting points. None of these patents discloses or fairly suggests the same aryloxy-poly (alkyleneoxy) naphthalimide derivative compounds as mentioned above. Of particular importance is the production of a fluorescent, liquid compound for utilization as a fluorescing colorant within various aqueous or non-aqueous based systems. It has been taught in the past, such as within my U.S. patent application Ser. No. 09/025,201, that either etheramines or branched long-chain alkylamine reactants were necessary to produce suitably liquid naphthalimide-derivative colorants. However, as above, there is no disclosure within this application to naphthalimide colorant compounds which comprise aryloxypolyoxyalkylene moieties so as to provide a highly effective fluorescent colorant within all different types of liquid and/or solid media. Furthermore, there is no teaching or fair suggestion within the pertinent art which even alludes to a naphthalimide colorant which can be adapted for use in different media through the alteration of the chain length of aryloxy-poly(alkyleneoxy) pendant groups. Thus, there still exists a need to develop such a particular type of intermediate, as well as different naphthalimide derivatives which are liquid in nature at ambient temperature and pressure and while substantially pure exhibiting different chain-length pendant groups at the available reactive sites on the base compound. Again, the prior art has not accorded such an improvement within this specific colorant industry.

DESCRIPTION OF THE INVENTION

It is thus an object of the invention to provide water-soluble naphthalimide derivative colorants which comprise aryloxy-poly(alkyleneoxy) groups. It is another object of this invention to provide an aryloxy-poly(alkyleneoxy) derivative naphthalimide intermediate compound which facilitate the addition of aminoalkyl groups to the remaining reactive sites of the compound in order to provide a method of producing naphthalimide colorants having different chain-length pendant groups in order to effect color variations and/or water- or solvent-solubility. A further object of the invention is to provide an aryloxy-poly(alkyleneoxy) naphthalimide precursor to which can easily be added necessary water-solubilizing alkyl, branched alkyl, or aminoalkyl groups. Yet another object of this invention is to provide a relatively inexpensive method for producing such beneficial liquid fluorescent naphthalimide derivative colorant compounds.

The present invention encompasses water-soluble naphthalimide derivative compounds which are liquid, waxy, or pasty at ambient temperature and pressure and at substantial purity. By ambient, it is meant within a range of from about 20–25° C. and from about 0.8 to about 1.2 atmospheres. By substantial purity, it is meant that no additional solvent, diluents, and the like, are present and the subject colorant, as defined by its structure, is present in an amount of at least 90% of the final colorant composition. In this manner, other colorants which are similar in structure to the subject colorant may also be present but only in minimal amounts. Furthermore, the inventive liquid compounds are readily soluble within myriad compositions, including aqueous-based formulations, and many non-aqueous systems. Such a liquid state, as well as such versatile solubility, provide these naphthalimide compounds with a distinct advantage over other is naphthalimide derivatives which are generally solid or waxy in nature and highly insoluble in such aqueous and non-aqueous media. Furthermore, the inventive compounds provide excellent fluorescing and coloring characteristics within such media, and are particularly effective when combined with other colorants, dyes, and pigments. As such, the inventive naphthalimide derivative colorant compounds can be utilized in applications where standard naphthalimide dyes were inoperable in the past. More pointedly, colorants having target solubility characteristics are easily produced through the inventive method, thereby providing a highly versatile procedure of manufacturing specific colorants depending on their desired end uses. The inventive colorants can be utilized over a wide pH range and are compatible with fragrances and preservatives, as merely examples, without complexing or destabilizing the resultant mixture. These colorants are also compatible with most cationic, anionic, non-ionic, and quatemary systems. Lastly, since the inventive colorants produce true solutions and not emulsions nor dispersions, the formulations made therefrom are homogeneous, clear, and brilliant in appearance.

Accordingly, this invention includes a colorant compound as defined by the Formula (I)

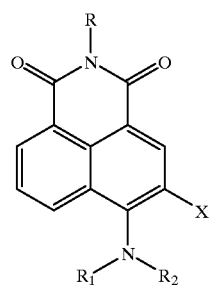

(I)

wherein, R is aryloxy-poly(alkyleneoxy); $R^1$ and $R^2$ are the same or different and are selected from the group consisting of hydrogen, lower alkyl, lower hydroxyalkyl, and polyoxyalkylene; and X is hydrogen, $SO^-_3$, and $NO_2$. Furthermore, this invention encompasses an intermediate of this compound which includes a compound defined by the Formula (II)

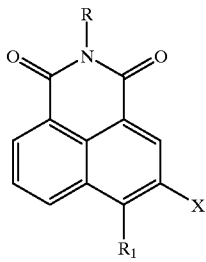

(II)

wherein, R is aryloxy-poly(alkyleneoxy), wherein the aryl group is directly bonded to the nitrogen; $R^1$ is selected from the group consisting of chloro and bromo groups; and X is selected from the group consisting of hydrogen, $SO^-_3$, and $NO_2$. Preferably, the particular oxyalkylene groups are selected from ethyleneoxy (EO), propyleneoxy (PO), and butyleneoxy (BO) groups. Preferably, these moieties are all EO groups, although combinations of EO and any of the others may be utilized as well. Preferably, from about 2 to about 50 moles of alkyleneoxy groups are present on each separate polyoxyalkylene pendant group; more preferably from about 2 to 10 moles; and most preferably from about 2 to 6 moles. The term "polyoxyalkylene" is intended to encompass any pendant group which includes at least two alkyleneoxy moieties.

The addition of aryloxy-poly(alkyleneoxy) groups to the naphthalmide base compound may be accomplished through the reaction of 4-halo-1,8-naphthalic anhydride with a number of different compounds. One type of reaction includes the initial imidization of the anhydride compound by the condensation of poly(oxyalkylene)-oxyaryl-amines. This reaction does not affect the halogen atom on the anhydride thereby permitting a further substitution reaction with the halogen to add either more polyoxyalkylene groups (to increase water solubility) or other moieties, such as oxyalkylamines, alkylamines, cyclic groups, such as morpholine, piperidine, and pyrrolidine groups (as merely examples), and the like, to alter the solubility or coloring characteristics of the naphthalimide derivative compound. Such further reactions are accomplished through a substitution reaction which displaces the remaining halogen atom. In such a reaction, it is generally necessary to add an hydrochloric acid scavenger (such as sodium carbonate or excess amine) to control the pH of the reaction.

Preferably, the colorant compound (I) is liquid in nature at ambient temperature and pressure and at substantial purity; however, pasty or waxy colorants (which are readily soluble ill water) are also encompassed within this invention. In order to effectuate coloring of substrates and media, any other standard colorant additives, such as resins, preservatives, surfactants, solvents, antistatic compounds, and the like, may also be utilized within the inventive colorant compound compositions or methods.

DESCRIPTION OF THE PREFERRED EMBODIMENT

The general method of making the preferred inventive colorant is as follows:

First, an intermediate of Formula (II), above was formed to which the necessary water-solubilizing and colorizing pendant groups were then added. The presence of an aryloxy-poly(alkyleneoxy) moiety permitted easy addition of the necessary pendant groups in order to provide the desired color strength and shade as well as the targeted degree of water solubility.

The specific formulations below, as well as the following exemplified methods of coloring are thus indicative of the preferred embodiments of this invention:

Intermediate Formation

EXAMPLE 1

108.3 grams of O-polyethoxylated-p-aminophenol (95.5% solids), having an average of 10 moles of ethylene oxide, were mixed with 105 grams of water. The pH of the solution was adjusted to between 7 and 10 through the addition of sodium hydroxide. To the resulting mixture were added 27.5 grams of 4-chloro-1,8-naphthalic acid anhydride (available from Aceto Corporation). The mixture was gradually heated to about 130° C. and the water was allowed to distill from the reaction vessel. After 2 hours of heating at 130°, the reaction yielded 134 gram, of a viscous brown liquid conforming to Formula (III):

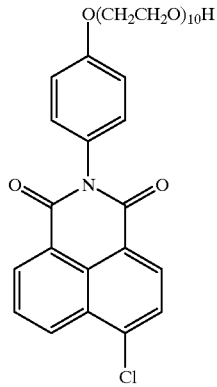

(III)

Colorant Compound Production from the Aryloxy Intermediate

EXAMPLE 2

15.8 grams of monoethanolamine and 7.2 grams of sodium carbonate were added to 134 grams of the precursor of EXAMPLE 1. The mixture was heated at 130° and stirred for 8 hours. The resultant composition was then cooled to obtain a viscous liquid of dark fluorescent yellow color and exhibiting excellent solubility in water corresponding to the structure in Formula (IV):

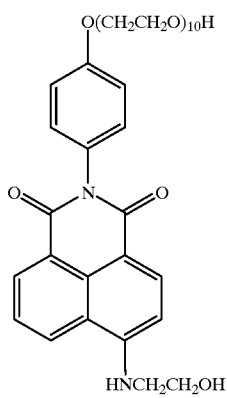

(IV)

There are, of course, many alternative embodiments and modifications of the present invention which are intended to be included within the spirit and scope of the following claims.

What I claim is:

1. colorant compound as defined by the Formula (I)

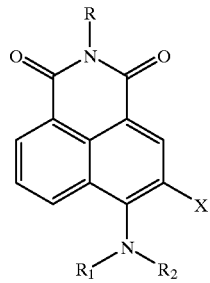

(I)

wherein, R is aryloxy-poly(alkyleneoxy), wherein the aryl group is directly bonded to the nitrogen; $R^1$ and $R^2$ are the same or different and are selected from the group consisting of hydrogen, lower alkyl, lower hydroxyalkyl, and poly (oxyalkylene), and X is hydrogen, $SO^-_3$, and $NO_2$.

2. A compound defined by the Formula (II)

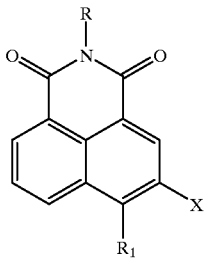

(II)

wherein, R is aryloxy-poly(alkyleneoxy); $R^1$ is selected from the group consisting of chloro and bromo; and X is selected from the group consisting of hydrogen, $SO^-_3$, and $NO_2$.

3. A method of producing a compound as defined by the formula (I)

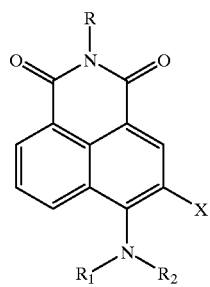

(I)

wherein, R is aryloxy-poly(alkyleneoxy), wherein the aryl group is directly bonded to the nitrogen; $R^1$ and $R^2$ are the same or different and are selected from the group consisting of hydrogen, lower alkyl, lower hydroxyalkyl, and poly (oxyalkylene), and X is hydrogen, $SO^-_3$, and $NO_2$;

wherein said method entails the sequential steps of (a) forming a precursor as defined by Formula (II)

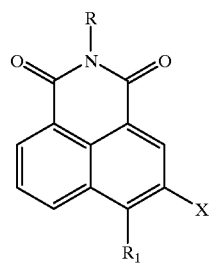

(II)

wherein, R is aryloxy-poly(alkyleneoxy); $R^1$ is selected from the group consisting of chloro and bromo; and X is selected from the group consisting of hydrogen, $SO^-_3$, and $NO_2$; and (b) reacting said precursor with a compound selected from the group consisting of alkanolamines, poly(oxyalkylene)oxyaryl-amines, polyglycolamines, and any mixtures thereof.

* * * * *